United States Patent Office 3,218,484
Patented Nov. 16, 1965

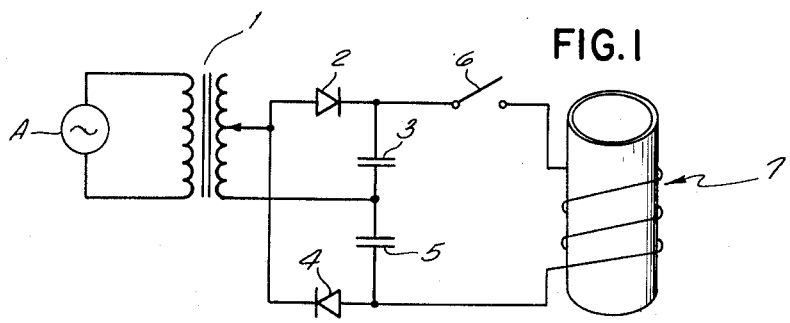
FIG. 1
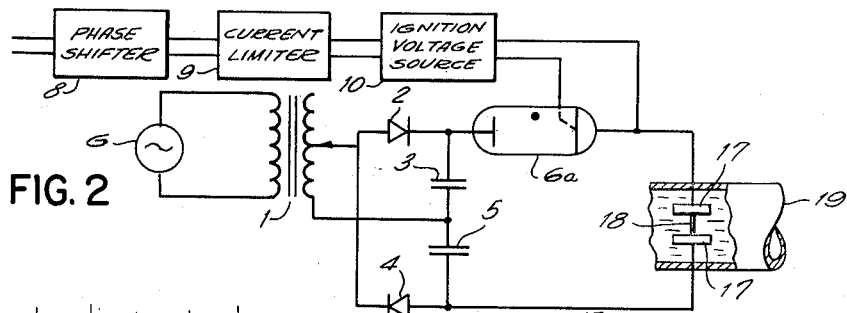
FIG. 2
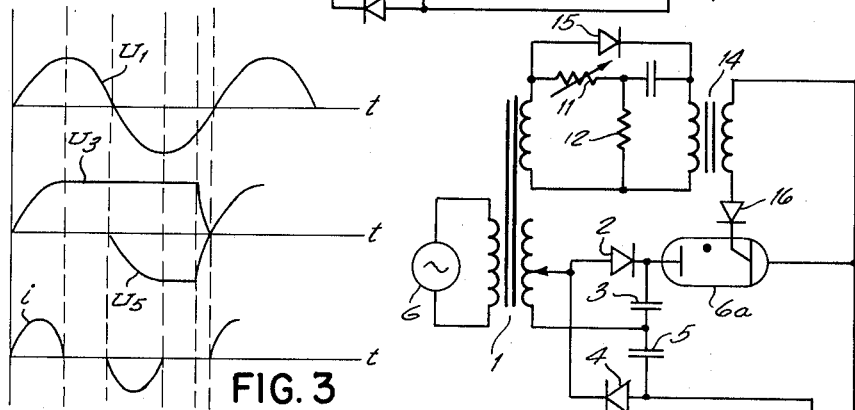
FIG. 3
FIG. 4
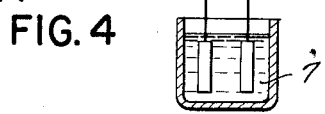
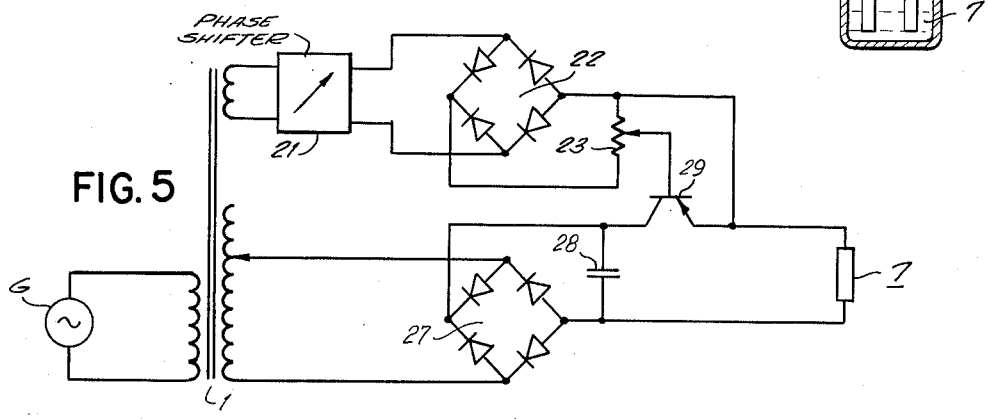
FIG. 5

3,218,484
APPARATUS FOR PRODUCING PRESSURE WAVES
Heinz Matusche, Hamburg, Germany, assignor to
Jurgen Dethloff, Hamburg-Lokstedt, Germany
Filed Oct. 12, 1962, Ser. No. 232,326
Claims priority, application Germany, Aug. 14, 1958,
D 28,758
2 Claims. (Cl. 307—104)

This is a continuation-in-part of my copending application Serial No. 830,494, filed July 30, 1959, now Patent Number 3,058,252.

My invention relates to apparatus for producing pressure waves, particularly shock waves, by electric or electro-inductive means primarily energized by direct-current pulses. In particular, my invention relates to such apparatus wherein the necessary electric pulse energy is obtained by charging capacitors from an alternating source and thereafter discharging the capacitors through the pressure-producing equipment.

The resulting power is useful in its magnetic form for deforming metals by such electromagnetic forming methods as known, for example, from U.S. Patent 2,976,907. The power transformed into shock waves is also suitable for deforming of metals or for their treatment. For example, shock waves can be used to sinter metal powder or to effect hydro-electric forming of a workpiece. However, the invention also comprises using the pressure-wave power for sterilizing purposes, preferably for preserving food. For this purpose, article to be sterilized or preserved is placed into liquid serving as a transmitting medium for shock waves rendering the microbes therein inactive.

Short-time direct-current pulses as chiefly used at present for magnetic or explosive metal forming, are produced by charging a condenser through a rectifier from an alternating-current source. The condenser is then connected across the forming equipment proper. This has the disadvantage that the charging current flows only during a portion of one-half cycle from the source, while during the other half-cycle no current flows. In this manner, the generator is loaded asymmetrically. Even with the use of a so-called "Villard" or "Siemens" voltage-doubling circuit, as well as with circuits for quadrupling the rectified voltage, the load upon the generator remains asymmetrical.

In other conventional circuits the effect of severe load transients upon the generator is alleviated by a buffer capacitor. Such a capacitor is many times larger than the pulse storing capacitor and is, by means of a switch, galvanically separated from the parallel connected pulse storing capacitor during ignition.

In still other known circuits the pulse storing capacitor, with the aid of four switches, is switched after each discharge, with its ends reversed into parallel relation with the buffer capacitor. However, in all circuits utilizing buffer capacitors the voltage upon the buffer capacitor decreases after each pulse only to a proportion of the rectified voltage corresponding to the ratio of buffer capacitance to pulse storage capacitance, and thus alleviates the current jolts upon the generator. However, this circuitry is quite expensive and, if the pulse frequency corresponds to the generator frequency and a single-phase generator is used as a current source, the generator still is loaded asymmetrically.

It is an object of the invention to obviate the above-mentioned disadvantages and to afford using for pressure-wave production a generator or other alternating-current source of lower power rating and hence lower weight and smaller space requirements than heretofore needed for a given power demand of the low-ohmic induction coil, explosion wire or other pressure-wave producing equipment.

Another object, more specific than, and subsidiary to, the one mentioned, is to secure, with the aid of relatively few components, a symmetrical loading of the single-phase generator or other alternating-current source, and to energize the mentioned pressure-wave producing equipment by pulses of a frequency corresponding to one-half cycle of the source frequency or to an integral-multiple thereof.

According to a feature of my invention, I charge capacitor means from a single-phase source during each half-cycle of the source voltage. In a more particular aspect, I provide two interconnected capacitors and charge them during alternating half-cycles through respective rectifiers. Then during or near the zero passage of the source voltage, after each full cycle, I switch the capacitors across the low ohmic coil of a pressure-wave producing assembly for swaging, crimping, expanding or otherwise forming or treating metal. In other embodiments the capacitors are connected, under control by the switch, to an explosion wire to produce shock waves, as employed for electro-hydraulic forming. According to still another embodiment, I switch the capacitor voltages across two electrodes immersed in a liquid food-containing medium. The closing time of the switch is short relative to the cycle period of the source voltage. As a result, the generator or other source is loaded equally in the positive and negative half-cycle periods without having the pressure producing equipment draw current directly from the generator during the pulse discharge. In this manner, as well as because of the simple construction and the small number of structural elements, the apparatus according to the invention is advantageously distinguished from the hitherto known apparatus of this type.

The invention will be further explained with reference to the embodiments of the invention illustrated by way of example on the accompanying drawing wherein:

FIG. 1 is a simplified electric circuit diagram shown in conjunction with a schematic illustration of a coil surrounding a piece of metal to be formed;

FIG. 2 is an explanatory circuit diagram relating to the use of an electronic switch-in apparatus according to FIG. 1 in connection with another load type;

FIG. 3 is an explanatory graph indicating typical voltage and current curves as occurring in the apparatus according to the invention;

FIG. 4 is a complete schematic circuit diagram relating to electronic apparatus of the type corresponding to FIGS. 1 and 2; and FIG. 5 is another circuit diagram embodying features of the invention.

According to FIG. 1, an alternating-current generator G of conventional voltage and frequency, for example 110 or 220 volts at 50 or 60 cycles, is connected to a transformer 1 of adjustable output voltage. The secondary circuit of transformer 1 is a voltage-doubler circuit comprising rectifiers 2 and 4 and capacitors 3 and 5. A normally open switch 6 connects the voltage of the voltage-doubler circuit across the load 7 consisting of a low-ohmic inductance coil surrounding a metal cylinder to be formed. The manner of formation corresponds to that shown in U.S. Patent 2,976,690, when pulses are applied. In effect, the current pulse through the coil applies a heavy pressure squeezing the tube.

During the half-cycle when the tap of the transformer 1 is positive, the generator charges the capacitor 3 through the rectifier 2. During the opposite half-cycle, the capacitor 5 is charged. The charge on both capacitors 3 and 5 is maintained by the effect of the high inverse impedance of rectifiers 2 and 4, and by the open condition of switch 6.

The capacitors 3 and 5 may be discharged simultaneously by closing the switch 6. The discharge is, of course, rapid due to the small resistance of the load winding 7.

If the discharge occurred during a time when the voltage is comparatively high in one of the generator cycles, for example at a time when the voltage tap in transformer 1 is positive, then a current path parallel to and including the discharge path of the capacitors would be formed through the rectifier 2, the switch 6, the winding 7 and the discharging capacitor 5; and this low impedance path would place a severe load upon the generator G.

According to a feature of the invention, however, such loading of the generator is avoided because the switch 6 is controlled by the generator G or source G so that capacitor discharge occurs only when the voltage at the mid-tap of transformer 1 passes through, or is near, the zero potential. Thus during the short-time discharge of the capacitors no additional load will affect the source. During the moment of discharge, the load winding 7 sustains a direct voltage having double the value of the maximum voltage at the transformer 1. Since the time constant of capacitors 3 and 5 as well as the load 7 is small relative to the voltage period or cycle of the voltage source, the capacitors discharge before the amplitude of the generator voltage reaches a significant value.

The switch 6 in FIG. 1 can consist of a high-power four-layer diode or ignition discharge vessels, for example ignitrons, which are used for rectifying large currents. In such ignitrons, ignition electrodes initiate the main flow of current which is automatically extinguished when the voltage across the main electrodes carrying the current decreases below the extinction voltage. Such an ignitron switch 6a, with its controls 8, 9 and 10, is shown in FIG. 2 in connection with the circuit of FIG. 1.

In FIG. 2, the load constitutes a liquid medium in a vessel 19 having placed therein a pair of electrodes 17 which may be connected to each other by an explodable conductor 18. In FIG. 2, the switch 6a is controlled by a variable phase shifter 8 connected to the transformer 1, a current limiter 9 and an ignition-voltage source 10. As indicated, an ignitron is used as a switch. The phase shifter 8 is connected to an alternating current source, preferably synchronous with the generator voltage. The current limiter 9 produces a trapezoidal wave form with a differentiator and means for suppressing the negative pulse peaks. The ignition-voltage source 10 may be of the conventional thyratron type.

Ignitron firing circuits, which are also applicable to firing four-layer semiconductor devices, including phase shifters such as 8 or a limiter such as 9, are well known and are available from the large manufacturers. For examples of such control circuits reference may be had to "Electron Tube Circuits" by Samuel Seely published by the McGraw-Hill Book Company in 1950, pages 126 to 289. Page 289 shows a phase-controlled thyratron (which may be the ignitron voltage source 10 for controlling the firing of an ignitron). An applicable elementary circuit for firing an ignitron with the aid of a thyratron is also shown in section 2–141 of "Industrial Electronics Handbook" edited by Cockwell, McGraw-Hill Book Company, 1958. Other circuits of this kind are described in section 9–46 of Knowlton's "Standard Handbook for Electrical Engineers," McGraw-Hill Book Company, 1957.

The operation of the electronic apparatus is as described above with reference to FIG. 1. The capacitors each charge during opposite half-cycles. The ignitron 6a is ignited once during each cycle by controls 8, 9, and 10 upon zero-passage of the voltage at the tap of transformer 1.

Typical time curves of the occurring voltages and currents are represented in the graph shown in FIG. 3 in which the ordinate represents the time $t$. The sine wave of the transformer or generator voltage is represented by the curve $U_1$. The time curve of the voltage at the capacitor 3 is shown at $U_3$ and the voltage of capacitor 5 at $U_5$. Denoted by $i$ is the current drawn from the generator source. This current flows through the respective capacitors 3 and 5 during the intervals of increasing capacitor voltage and is equally distributed upon both half portions of the cycle.

The circuit diagram shown in FIG. 4 avoids the use of any electronic tubes in the ignition control circuit of the ignitron 6a. The load constitutes a food-containing liquid medium which is contained in a vessel and which is contacted by two electrodes. The capacitive pulse circuit of the electrodes and its operation are described with reference to FIGS. 1 to 3. The firing circuit of ignitron 6a comprises a phase shifter which is inductively coupled with the transformer 1 and is composed of two ohmic resistors 11, 12 and a capacitor 13. The firing pulses are taken from an ignition transformer 14 which becomes magnetically saturated through a rectifier diode 15. The firing pulse induced in the secondary winding of transformer 14, is applied to the ignitron 6 through a diode 16 which keeps the negative portion of the firing pulses away from the ignition electrode of the ignitron 6a. Consequently, the electronic switch according to this embodiment is momentarily closed only at or near those recurrent moments at which the alternator voltage passes from the values of one given polarity through the zero value, thus causing a capacitor discharge in intervals equal to a full cycle period of the alternator voltage.

In the embodiment schematically illustrated in FIG. 5, the generator source G is connected through the transformer 1 with a full-wave rectifier bridge network 27 which charges a capacitor 28. The discharge from the capacitor into the electrode circuit is shown controlled by a four-layer semiconductor device 29, it being understood that for providing and controlling the necessary amounts of current a group of parallel connected semiconductor devices, on the one hand, and a group of parallel connected capacitors, on the other hand, may be used. The base-emitter circuit of semiconductor device 29 receives an ignition pulse from transformer 1 through a phase shifter 21, a full-wave rectifier 22, and a potentiometer 23. In this case, the firing control operates to turn on the semiconductor device 29 at a moment near each individual zero passage of the voltage at the tap of transformer 1.

The loads 7 and 19, as well as others contemplated by the invention, comprise low-ohmic devices, which if connected across the transformer 1 near the maxima or minima of the voltages, would constitute severe and dangerous shock loads. By virtue of the invention it is possible to produce magnetic metal-deforming waves and pressure-waves within liquid-filled containers with simple equipment which need not compensate for extreme shock.

The power output (W) of the pulses is given by the formula $W=0.5CE^2f$, where E is the direct voltage of the pulse capacitors, C is the total capacitance of the capacitors, and $f$ is the frequency of pulse recurrence, such as 50 or 60 c.p.s.

The following numerical examples are further illustrative of the invention and of the advantages achieved thereby. An example of a desired time constant of the discharge pulse is $t=0.5 \cdot 10^{-3}$ second. The impedance of the electrode circuit in a system according to FIGS. 1, 2 or 4, in practice, may possess, aside from the capacitance of the pulse capacitors, a purely ohmic resistance of 0.1 ohm, substantially formed by the transition resistance between the two electrodes in sea water. Under these practical conditions exemplified, the total capacitance of the capacitor group must be $C=5000$ $\mu$F, so that each of the capacitors or capacitor groups 3 and 5 may be given a capacitance of 10,000 $\mu$F. As explained, an apparatus according to the invention does not require any buffer capacitors which in known systems require a great multiple in capacitance in addition to the pulse capacitors proper.

The voltage E can be adjusted as necessary. It is understood that the values being given here are only exemplary. Using an alternating source G of 220 volts output voltage and a frequency of 50 c.p.s., a total power output W of 3 kilowatts is required for a capacitor total voltage of $E=155$ volts, requiring each of the capacitors 3 and 5 to be subjected to a charging voltage of 77.5 volts. For a voltage of 490 volts, a power output of 30 kilowatts is required, the voltage being equally distributed upon the two capacitors 3 and 5. It will be realized from these examples that the power and voltage requirements in apparatus according to FIGS. 1, 2 or 4 with a voltage-doubler connection, are extremely favorable and permit the use of conventional power sources or generators, together with other components of conventional type and relatively small space requirements. This is due to the fact that the curent source need be rated only as required by the amount of power to be disseminated for producing shock waves or electromagnetic waves, but need not be rated for any shock loads since loads of the latter type do not occur by virtue of the present invention. The time spacing of the electrotaxis pulses, being equal to, or an integral multiple of, the source cycle frequency is also favorable in practice.

An embodiment of the type exemplified by FIG. 5 is less preferred for reasons that will appear presently. When using a full-wave rectifier, the desired symmetrical loading of the current source requires making the pulse frequency twice that of the source cycle frequency, so that the discharge capacitor is charged during each half-wave and is discharged at the moment or near each zero passage of the source voltage. When using a source of 50 c.p.s. frequency, the frequency of pulse recurrence will be 100 c.p.s., which is less favorable. Furthermore, a total of four rectifiers are needed instead of only two used in the voltage doubler circuit. It will further be understood that either the source voltage or the secondary transformer voltage must be twice as high as in the voltage doubler system. In all other respects, however, an apparatus according to FIG. 5 also permits realizing the novel advantages of the present invention.

The invention contemplates using the various members such as phase shifters, switches and loads in suitable combinations other than those specifically described. For example, the invention contemplates each type of load being connected in each circuit shown. Also each switch may have any of the phase shifters shown and each circuit may include any of the switches shown.

While various embodiments of the invention have been disclosed in detail it will be obvious to those skilled in the art that the invention may be practiced otherwise within the scope of the following claims.

I claim:
1. Apparatus for producing shock pressure waves, comprising single-phase alternating power source means, capacitor means, rectifier means connecting said capacitor means and said source means for charging said capacitor means, a mechanical pressure producing device having an inductance winding adapted to receive therein a workpiece to be subjected to shock pressure due to the magnetic field of said winding, switch means intermediate said capacitor means and said pressure producing device for intermittently connecting said capacitor means to said winding for causing it to produce said field, and control means connected to said switch means responsive to the voltage of said source means for closing said switch means only at given zero passages of alternating voltage at said source means.

2. Apparatus for producing shock pressure waves, comprising single-phase alternating power source means, capacitor means, rectifier means connecting said capacitor means and said source means for charging said capacitor means, a mechanical pressure producing device having an inductance winding adapted to receive therein a workpiece to be subjected to shock pressure due to the magnetic field of said winding, switch means intermediate said capacitor means and said pressure producing device for intermittently connecting said capacitor means to said winding for causing it to produce said field, and control means connected to said switch means responsive to the voltage of said source means for closing said switch means only at given zero passages of alternating voltage at said source means, said capacitor means including a pair of capacitors in voltage doubler connection, said switch means being a controllable electronic rectifier, and said control means including a phase shift network and a pulse network for igniting said rectifier.

References Cited by the Examiner
UNITED STATES PATENTS

| | | | |
|---|---|---|---|
| 2,081,243 | 5/1937 | Macy | 99—253 |
| 2,136,375 | 11/1938 | Forest | 324—38 |
| 2,773,184 | 12/1956 | Rolf | 307—108 |
| 3,058,252 | 10/1962 | Matusche | 320—1 |

LLOYD McCOLLUM, *Primary Examiner.*

ROBERT E. PULFREY, *Examiner.*